United States Patent [19]

Pettet et al.

[11] Patent Number: 4,694,420

[45] Date of Patent: Sep. 15, 1987

[54] INVERSE ASSEMBLY METHOD AND APPARATUS

[75] Inventors: Mark E. Pettet, Hillsboro; Gerd H. Hoeren, Lake Oswego, both of Oreg.

[73] Assignee: Tektronix, Inc., Beaverton, Oreg.

[21] Appl. No.: 814,152

[22] Filed: Dec. 23, 1985

Related U.S. Application Data

[63] Continuation of Ser. No. 417,014, Sep. 13, 1982, abandoned.

[51] Int. Cl.[4] .............................................. G06F 15/00
[52] U.S. Cl. ...................................... 364/900; 371/19
[58] Field of Search ... 364/200 MS File, 900 MS File, 364/200, 900, 300; 371/20, 25, 27, 17, 19; 324/73 R, 73 AT

[56] References Cited

U.S. PATENT DOCUMENTS

| | | | |
|---|---|---|---|
| 3,105,143 | 9/1963 | Hosier et al. | 364/200 |
| 3,883,847 | 5/1975 | Frank | 364/900 |
| 3,918,047 | 11/1975 | Denes | 340/347 DD |
| 3,987,420 | 10/1976 | Badagnani | 371/17 |
| 4,099,230 | 7/1978 | Mead | 364/200 |
| 4,205,371 | 5/1980 | Feather | 364/200 |
| 4,231,087 | 10/1980 | Hunsberger et al. | 364/200 |
| 4,309,756 | 1/1982 | Beckler | 364/300 |
| 4,312,066 | 1/1982 | Bantz et al. | 371/16 |
| 4,398,249 | 8/1983 | Pardo et al. | 364/300 |
| 4,475,174 | 10/1984 | Kanayama | 364/900 |
| 4,493,044 | 1/1985 | Hoeren et al. | 364/579 |
| 4,498,148 | 2/1985 | Glickman | 364/900 |
| 4,533,997 | 8/1985 | Furgerson | 364/200 |
| 4,541,069 | 9/1985 | Kanou et al. | 364/900 |

Primary Examiner—Gareth D. Shaw
Assistant Examiner—Jonathan Fairbanks

Attorney, Agent, or Firm—John H. Bouchard; John P. Dellett; Francis I. Gray

[57] ABSTRACT

An inverse assembly method for converting binary executable microprocessor code into corresponding assembly language mnemonics provides for the storage of all the possible binary codes and corresponding assembly language mnemonics in a plurality of tables set up in a decision tree form which corresponds to the format of a user document provided by the manufacturer of a target microprocessor. The instructions and data information contained within the executable code acquired from the taret microprocessor are distinguishably tagged prior to being stored in an acquisition memory. The code from the acquisition memory, in binary or hex form, indexes a primary table which contains a plurality of entries containing a binary value which may have a mask portion, each entry containing a plurality of actions having an optional string to be displayed, optional parameter masks and an optional table to call. The unmasked portion of the binary value is compared with the code from the acquisition memory and, if a match occurs, this entry is used for further processing, otherwise the comparison process moves on to the next entry in the table. Once a match is found a character string is displayed, parameter bits are picked off to be passed to another table, and another table is called within the decision tree. This continues until all actions are completed, including calls to additional tables which are similarly processed. After the processing of each called, or current, table is completed, a return to the calling table is made, and if there is no calling table then disassembly for the current code from the acquisition memory is completed. In like manner all the acquired executable code is processed to obtain the corresponding assembly language mnemonic.

3 Claims, 8 Drawing Figures

STATE TABLE DISPLAY: REFERENCE   COMPARE: START SEQ [ 0 ]
                                          STOP  SEQ [511]

TRIG = F7E6D  01011111  1001  FF7D
SRCH = [XXXX] [XXXXXXXX] [XXXX] [XXXX]
MASK = [1111] [11111111] [1111] [1111]

| SEQ | ADDR | CTRL | DATA |
|-----|------|------|------|
| 14  | FFFF0 | 0000 | 00EA |
| 15  | FFFF2 | 0010 | 00E0 |
| 16  | FFFF4 | 0000 | 00F0 |
| 17  | FFFF6 | 0000 | 0000 |
| 18  | FE000 | 0000 | 7EBC |
| 19  | FE002 | 0010 | C704 |
| 20  | FE004 | 0001 | 4206 |
| 21  | FE006 | 0000 | 0204 |
| 22  | FE008 | 0000 | 3300 |
| 23  | FE00A | 0000 | B9C0 |
| 24  | 00442 | 0110 | 0002 |
| 25  | FE00C | 0001 | 001A |
| 26  | FE00E | 0000 | 02BF |
| 27  | FE010 | 0010 | 8804 |
| 28  | FE012 | 0001 | 4705 |
| 29  | FE014 | 0010 | FBE2 |

16↑    18↑   20↑

DEFINE MNEMONICS   TABLE NAME: OPCODE01   MODE: TABLE ENTRY

| SEQ | P BIN | CALL | DISPLAY |
|---|---|---|---|
| 0 | 01000XXX |  | INC |
|  | -------- | XTAB |  |
|  | -----^^^ | REG16 |  |
|  | -------- |  |  |
| 1 | 01001XXX |  | DEC |
|  | -------- | XTAB |  |
|  | -----^^^ | REG16 |  |
|  | -------- |  |  |
| 2 | 01010XXX |  | PUSH |
|  | -------- | XTAB |  |
|  | -----^^^ | REG16 |  |
|  | -------- |  |  |

DEFINE MNEMONICS   TABLE NAME: REG16   MODE: TABLE ENTRY

| SEQ | P BIN | DISPLAY |
|---|---|---|
| 0 | 000 | AX |
| 1 | 001 | CX |
| 2 | 010 | DX |
| 3 | 011 | BX |
| 4 | 100 | SP |
| 5 | 101 | BP |
| 6 | 110 | SI |
| 7 | 111 | DI |
| 8 | XXX |  |
| 9 | XXX |  |
| 10 | XXX |  |
| 11 | XXX |  |
| 12 | XXX |  |
| 13 | XXX |  |
| 14 | XXX |  |
| 15 | XXX |  |
| 16 | XXX |  |
| 17 | XXX |  |
| 18 | XXX |  |

FIG. 3B.

STATE TABLE DISPLAY: [REFERENCE]   COMPARE: START SEQ [0]
                                            STOP  SEQ [511]
TRIG = F7E6D  01011111  1001  FF7D
SRCH = [XXXX] [XXXXXXXX] [XXXX] [XXXX]
MASK = [1111] [11111111] [1111] [1111]

```
   SEQ          8086 MNEMONICS

14    FFFF0  JMP    E000,F000
   18    FE000  MOVW   SP,#047E
   19    FE003  MOVW   0442,#0002
   22    FE009  XORW   AX,AX
   24    00442  0002     ( MEM WRITE )
   23    FE00B  MOVW   CX,#001A
   26    FE00E  MOVW   DI,#0402
   27    FE011  MOVB   (DI),AL
   28    FE013  INC    DI
   29    FE014  LOOP   FE011
   31    00402  00       ( MEM WRITE )
   33    FE011  MOVB   (DI),AL
   34    FE013  INC    DI
   35    FE014  LOOP   FE011
   37    00403  00       ( MEM WRITE )
   39    FE011  MOVB   (DI),AL
         22⁄           24⁄
```

FIG. 5.

INVERSE ASSEMBLY METHOD AND APPARATUS

This is a continuation of application Ser. No. 417,014, filed Sept. 13, 1982 and now abandoned.

BACKGROUND OF THE INVENTION

1. Field of the Invention

The subject matter of the present invention pertains to an inverse assembler for translating the executable code output from an assembler of a data processing system into a corresponding set of assembly language mnemonics for debugging software associated with said executable code.

2. Description of the Prior Art

Logic State Analyzers typically perform the function of an inverse assembler. An inverse assembler is utilized to translate a set of executable code, generated by an assembler of a data processing system, into a corresponding set of assembly language mnemonics for the purpose of debugging a software package representing the executable code. For example, in FIG. 1a, during a software development process, the executable code is generated either from an assembler or a compiler, the assembler inputs a set of assembly language instructions from a user thereby generating the executable code. The executable code comprises a multitude of binary codes representing the assembly language instructions, the executable code being used by the target system (which may be, for example, a microprocessor). In FIG. 1b, a software analysis process is performed by the logic analyzer-inverse assembler wherein the executable code, utilized by the target system, is converted into a corresponding set of assembly language mnemonics. The corresponding set of assembly language mnemonics is analyzed for the purpose of debugging the set of assembly language instructions. If the target system, shown in FIG. 1a, executed the assembly language instructions properly (developing the results desired by the user), as determined by the corresponding set of assembly language mnemonics, the set of assembly language instructions (or a high level language corresponding to the assembly language instructions) have been written correctly.

As mentioned above, the assembler assembles the set of assembly language instructions input by the user to generate the executable code comprising a multitude of binary codes. The target system is typically (but not limited to) a microprocessor. The microprocessor executes the binary codes produced by the assembler. Execution of these binary codes may be monitored by a logic analyzer. In order to debug the code, it is necessary that the binary codes (executed by the microprocessor) be re-converted to the original set of assembly language instructions, that is, be inverse assembled into the corresponding set of assembly language mnemonics, for interpretation thereof by the user.

In order to inverse assemble the multitude of binary codes into the corresponding set of assembly language mnemonics, it is necessary to enter and store into memory information required to build a table, the table including two columns of information: the first column comprising a list of binary codes representing all of the possible binary codes capable of being generated by the microprocessor, the second column comprising a corresponding list of assembly language mnemonics (instructions) associated therewith.

For each of the binary codes, associated with the multitude of binary codes produced by the microprocessor, the process of inverse assembly was comprised of the following steps: locating the binary code as an address in the first column of said table stored in said memory, and identifying the corresponding assembly language mnemonic (instruction) in the second column thereof. Therefore, using said table, the multitude of binary codes produced by the microprocessor are inverse assembled into the corresponding set of assembly language mnemonics.

However, with respect to the inverse assemblers of the prior art, the task involving building said table was quite lengthy and tedious, if not impossible to accomplish. For most eight (8)-bit microprocessors, the first column of said table was comprised of a list of $2^8$ entries (that is, 256). This number of entries is reasonable. However, if a 16-bit microprocessor was utilized, the first column of said table was comprised of a list of $2^{16}$ (that is, 65,536) entries of binary code. A user must therefore enter 65,536 binary codes and the associated instructions to build said table. If such a table is built, the memory space required to store said table would be quite large. Consequently, the process of inverse assembly using the inverse assembler of the prior art (in particular, when associated with the 16-bit processor) proved to be impractical, if not impossible, to accomplish.

Alternatively, the inverse assembler of the prior art included a read-only-memory having firmware encoded therein which was responsible for debugging the set of assembly language instructions executed by said microprocessor. However, the read-only-memory was responsible for disassembling the assembly language instructions executed by only certain specific types of said microprocessors. If other ones of said microprocessors were utilized to execute said instructions, the firmware in the original read-only-memory could not disassemble (or inverse assemble) the instructions.

It was therefore necessary to remove the read-only-memory and replace it with a different read-only-memory having firmware disposed therein which could, accurately, disassemble the assembly language instructions. The need to remove the original read-only-memory and replace it with a new one, when a different microprocessor was utilized to execute the set of assembly language instructions, severely limited the scope of use associated with said inverse assembler of the prior art.

SUMMARY OF THE INVENTION

It is a primary object of the present invention to overcome the disadvantages associated with the inverse assemblers of the prior art.

It is another object of the present invention to overcome said disadvantages by allowing the user of the inverse assembler of the present invention to enter the information required to build said table.

It is another object of the present invention to overcome the disadvantages associated with the inverse assemblers of the prior art by allowing said user to enter said information to build said table and by substantially reducing the number of entries of said binary codes and associated assembly language mnemonics (instructions) required to build said table associated with the inverse assembly process.

It is still another object of the present invention to overcome said disadvantages by reducing the number of said entries required for said user to build said table and by simplifying the user's process of entering the binary codes and the instructions associated therewith.

It is still another object of the present invention to distinguish between instructions and data information inverse assembled from said executable code.

These and other objects of the present invention are accomplished by providing an inverse assembler which permits the entry of all of the possible binary codes capable of being produced by the assembler and all of the corresponding assembly language mnemonics (instructions) associated therewith, during the process of building said table, the binary codes and the assembly language mnemonics being stored therein in the form of a set of decision tree tables whereby the elements associated with each branch of the decision tree are entered into the inverse assembler of the present invention in direct correspondence with the format of a user document published by the manufacturer of said microprocessor, and whereby each of the branches of the decision tree are linked together in decision tree form. Furthermore, the inverse assembler of the present invention is capable of inverse assembling the executable code such that instructions and data information contained therein are distinguishable, the instructions within the executable code being tagged by a first identification means, and the data information within the executable code being tagged by a second identification means, the instructions and the data information, and the corresponding first and second identification means corresponding thereto, acquired as part of the executable code, being stored in an acquistion memory of an acquisition device (such as the logic analyzer) and operated on by said inverse assembler.

Further scope of applicability of the present invention will become apparent from the description given hereinafter. However, it should be understood that the details of the description and the specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

A full understanding of the present invention will be obtained from the detailed description given hereinbelow and the accompanying drawings which are given by way of illustration only, and thus are not limitative of the present invention, and wherein:

FIGS. 3a and 3b collectively illustrate a pair of cathode-ray-tube displays on the inverse assembler of the present invention, wherein each of the binary codes capable of being produced by the microprocessor and the corresponding instructions are stored in said inverse assembler as a set of tables, the tables being stored in decision tree form, the table requiring a substantially reduced number of entries for completion thereof.

FIG. 5 illustrates the binary codes of FIG. 4 existing subsequent to the inverse assembly process performed by the inverse assembler of the present invention, the binary codes of FIG. 5 including a set of assembly language mnemonics corresponding thereto.

DETAILED DESCRIPTION OF THE PREFERRED EMBODIMENT

As mentioned hereinabove, it was stated that, in order to inverse assemble the executable code—that is, the multitude of binary codes, output from the assembler (i.e. microprocessor), it was necessary to build said table. However, with respect to the inverse assemblers of the prior art, the task involving building said table was very lengthy and tedious, if not impossible to accomplish. It was therefore one major object of this invention to reduce the number of entries of said binary codes and associated instructions required to build said table, while, simultaneously, simplifying the entry thereof. The first above mentioned objective, the reduction in the number of said entries, is accomplished by recognizing the following general principle: $2^n > 2^i + 2^j$ when $i+j=n$.

In the context of the present invention, if the assembler is a microprocessor, and if a 16 bit microprocessor is utilized, each binary code, that is, each bus transaction, generated by the microprocessor will be a 16 bit binary number. However, there are $2^{16}$ possible binary numbers which may be generated by the microprocessor, and therefore, there are $2^{16}$ possible instructions which need to be inverse assembled.

The inverse assembler of the prior art required that a table be built and stored in memory, the table, in the above example, having a first column comprising a list of $2^{16}$ binary numbers (for a 16-bit microprocessor), the second column being a list of $2^{16}$ instructions corresponding, respectively, thereto. With this high number of required entries, the table was difficult, if not impossible, to build. Alternatively, the inverse assembler of the prior art required that a microprocessor specific inverse assembly Read-Only-Memory (ROM) be inserted into the logic analyzer.

Figure 1A:
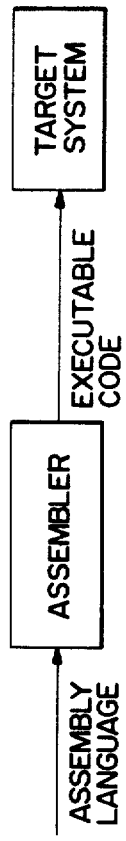
FIG. 1a illustrates a software development process wherein a high-level language or an assembly language is utilized to generate a set of executable code.
Figure 1B:
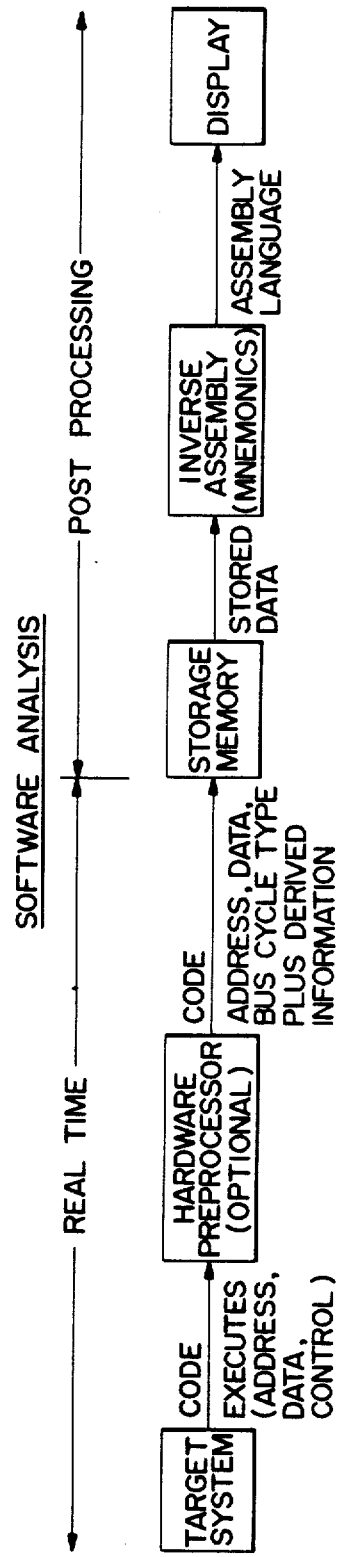
FIG. 1b illustrates a software analysis process wherein the executable code is converted into a set of assembly language mnemonics for debugging and analysis of the assembly language (the user written software).
Figures 2, 4:
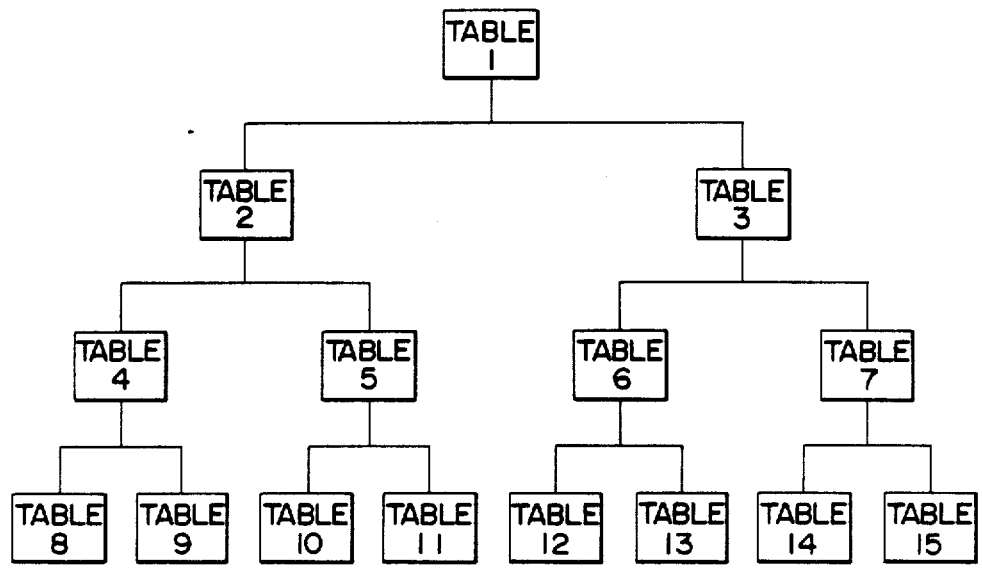
FIG. 2 illustrates a decision tree concept, a general concept utilized for storage of said tables in the inverse assembler of the present invention.
FIG. 4 illustrates the multitude of binary codes produced by the microprocessor and representing address, control and data information acquired by the inverse assembler of the present invention, the illustrated binary codes representing instructions and data information stored in the acquisition memory of the acquisition device (the logic analyzer) existing prior to the inverse assembly process performed by the inverse assembler of the present invention.

The inverse assembler of the present invention, on the other hand, also requires that said table be built. However, the table, to be built and stored in memory, will be structured in the form of a decision tree, wherein, in lieu of one table requiring a list of $2^{16}$ entries, two or more tables, linked together in the form of a tree, are utilized. Using the above example, two tables linked together may be utilized, each table having $2^8$ entries in the first and second columns thereof. Since $2^{16} > 2^8 + 2^8$, fewer entries are required to be made in each of the first and second columns of said two tables then are required in the single table of the prior art. Similarly, four tables, linked together in the form of said decision tree, may be utilized, each table requiring $2^4$ entries in the first and second columns thereof. Since $2^{16} > 2^4 + 2^4 + 2^4 + 2^4$, it is much easier to build four decision tree tables than to build the single table of the prior art. Reference is directed to FIG. 2 for an example of the decision tree concept, utilized by the present invention.

In FIG. 2, a plurality of tables are illustrated, linked together in decision tree form. The composition of each of said tables will be described with reference to FIGS. 3a and 3b. If table 1 is initially referenced by the inverse assembler of the present invention, to inverse assemble the executable code into a corresponding set of assembly language mnemonics, a decision is made to refer to either table 2 or table 3. If table 2 is referenced, a further decision is made to refer to either table 4 or table 5. If the table 5 is referenced, a further decision is made to refer to either table 10 or table 11. By referencing tables 1, 2, 5, and 11 in combination, one binary code (i.e. the 16 bit binary code), acquired by the inverse assembler of the present invention, output from the microprocessor, is inverse assembled into a corresponding assembly language mnemonic. If a 16 bit binary code must be inverse assembled, $2^4$ entries in each column of tables 1, 2, 5, and 11 are required in order to inverse assemble the 16 bit binary code into a corresponding assembly language mnemonic. It is much easier to provide $2^4$ entries in each column of these tables than to provide $2^{16}$ entries in each column of the single table, associated with the inverse assembler of the prior art.

Referring to FIGS. 3a and 3b, a cathode-ray-tube display on the inverse assembler of the present invention is illustrated. The display exhibits a more specific example of the decision tree structure of said table. In FIG. 3a, the "OPCODE∅1" table is illustrated. Eight (8) bit binary codes appear in the first column 10 of the "OPCODE∅1" table. A second column 12 is a "call" column, for referring to another table. A third column 14 is a display column for relating a portion of a binary code to an instruction. For example, a binary code "01000XXX" appears in the first column 10 in FIG. 3a. The binary numbers 01000 relate to an increment (INC) instruction. The last three generic bits, "XXX", are ignored when this table is searched and are passed, regardless of their value, to a table called "REG 16", as determined from column 12. Referring to FIG. 3b, table "REG 16" is illustrated. If the three generic bits "XXX" are "000", register identifier "AX" corresponds thereto. Therefore, by linking the "OPCODE∅1" 1 table (FIG. 3a) with the "REG 16" table (FIG. 3b), in decision tree form, it may be determined that a binary code "01000000" corresponds to an increment register AX ("INC AX") instruction.

The tables shown in FIGS. 3a and 3b are formatted in a unique way in order to simplify the entry of binary codes (FIG. 3a) and corresponding instructions associated therewith. As stated hereinabove, the microprocessor executes each instruction, producing for said each instruction a binary code. The manufacturer of each microprocessor (which processes the set of assembly language instructions set forth in the software to be de-bugged) supplies a set of user documentation wherein the binary codes generated by said microprocessor are correspondingly related to an instruction. The format of the tables shown in FIGS. 3a and 3b are purposely made to directly correspond to the format of the user documentation supplied by the manufacturer of the microprocessor. As a result of these matching formats, it becomes easier to enter the multitude of binary codes into the inverse assembler of the present invention and the corresponding instructions associated therewith during the process of building said table.

Referring to FIG. 4, the multitude of binary codes as stored in the acquisition memory of the logic analyzer inverse assembler is illustrated. These codes are generated by the microprocessor, corresponding to the multitude of instructions executed thereby. These binary codes are acquired by the logic analyzer (an Acquisition device) of the present invention from the microprocessor, and are stored in the acquisition memory. Note that these binary codes have not been subjected to the inverse assembly process performed by the logic analyzer inverse assembler of the present invention and therefore do not have associated therewith the assembly language mnemonics corresponding thereto.

The microprocessor is a component of a user's circuit. The user's circuit also includes a first memory (e.g. a ROM) for storing the set of assembly language instructions therein and a second memory (e.g. a RAM) for storing data information therein to be utilized by the microprocessor when executing the instructions stored in the first memory. In FIG. 4, a first column of information 16 includes address data indicative of the address in the first memory of the users circuit wherein the assembly language instructions are stored and indicative of the address in the second memory of the users circuit wherein the data information is stored. A second column 18 comprises a plurality of tag bits utilized for distinguishing between the binary codes, representative of the assembly language instructions generated by the microprocessor as part of the executable code and stored in the first memory and the binary codes representative of the data information also generated by said microprocessor, and stored in the second memory. A third column 20 comprises said assembly language instructions and data information in hexidecimal form corresponding to the addresses appearing in the first column 16. However, note that the instructions and data information, appearing in the third column 20, are not easy to decipher and understand, since the instructions and data information appear in the form of hexadecimal characters.

In order to debug the assembly language instructions disposed in said first memory of the user's circuit, it is necessary to be able to easily read the information appearing in column 20 of FIG. 4, that is, to be able to easily determine and analyze the instructions and data information retrieved from the microprocessor and disposed in the acquisition memory of the logic analyzer-inverse assembler to thereby determine the degree to which these instructions and data information disposed therein accurately reflect the set of assembly language instructions stored in the first memory of the user's circuit.

As a result, refering to FIG. 5, the multitude of binary codes, as shown in FIG. 4, after being subjected to the inverse assembly process of the present invention, is illustrated. A first column 22 represents the same address data shown in the first column 16 of FIG. 4. However, a second column 24 comprises the set of assembly language mnemonics, corresponding to the assembly language instructions and data information appearing in the third column 20 shown in FIG. 4. These assembly language mnemonics represent the instructions and data information disposed in the acquisition memory of the logic analyzer-inverse assembler and are utilized by the software designer to debug the set of assembly language instructions disposed in the first memory of the user's circuit.

However, as previously indicated in the paragraphs hereinabove, in order to convert the information shown in FIG. 4 to the information shown in FIG. 5, information must be entered and stored into a memory (a Random Access Memory) of the inverse assembler, in order to build said table, said table comprising the multitude of binary codes capable of being generated by the microprocessor in a first column thereof and the instructions or assembly language mnemonics corresponding thereto in a second column thereof. The assembly language instructions, in binary, or preferably hex form, shown in the third column 20 of FIG. 4, are located as an index to said table in the first column thereof, the corresponding assembly language mnemonic being located therein, in the second column thereof, the located assembly language mnemonic being used to form the display on the logic analyzer as shown in FIG. 5. However, if an 8-bit or larger bit-type, microprocessor in the users circuit was used in conjunction with the logic analyzer-inverse assembler of the prior art, as previously indicated, the task of building said table proved to be very difficult if not impossible to accomplish. Therefore, the decision tree structure of said table stored in the random-access-memory of the logic analyzer, in accordance with the present invention, is utilized, as shown in FIGS. 2, 3a, and 3b, in order to simplify the task of building said table.

Figure 6:
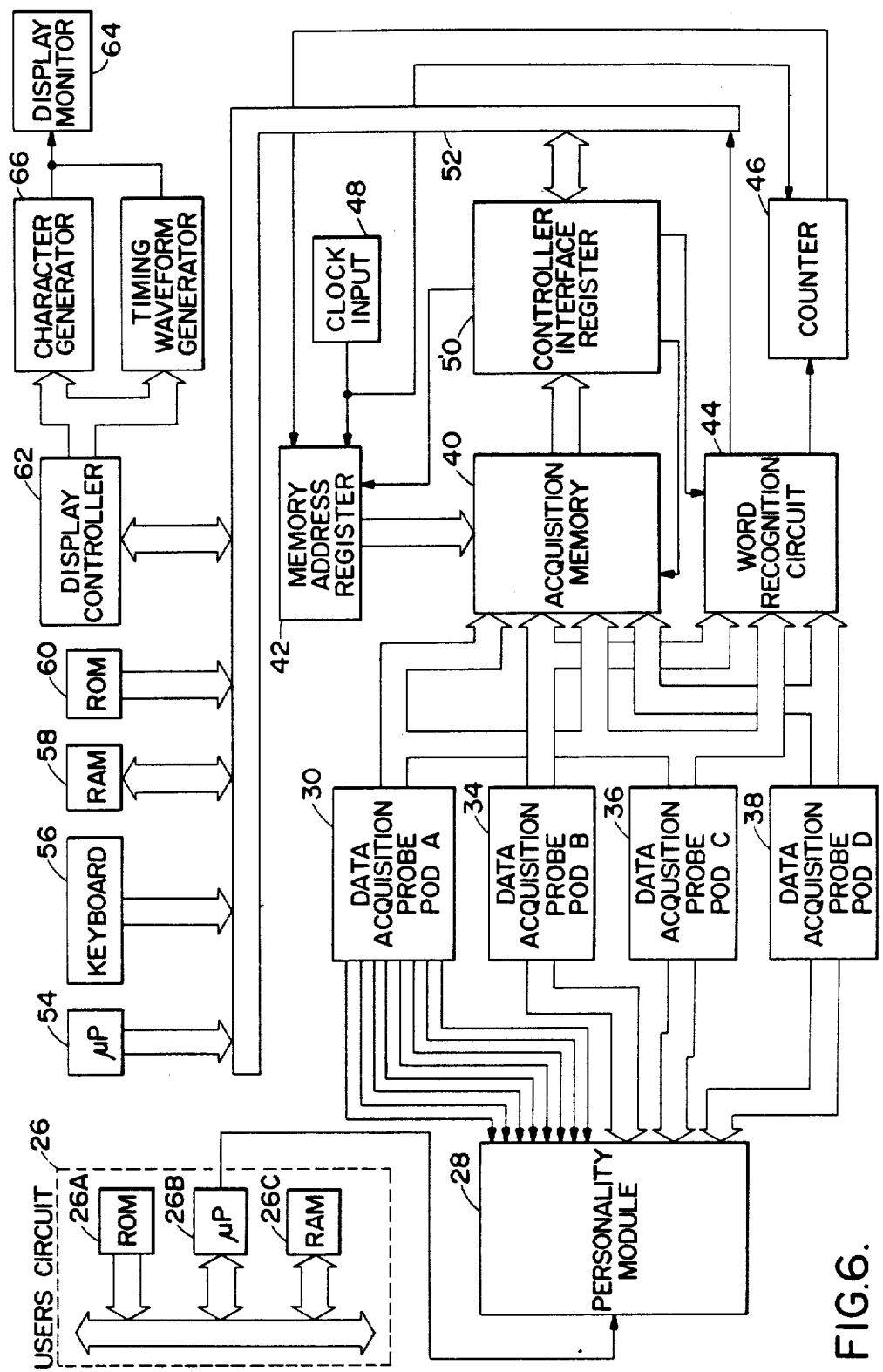
FIG. 6 illustrates a system block diagram of the inverse assembler of the present invention illustrated as being connected to a user's circuit, the user's circuit including, as a component part thereof, a memory for storing the binary codes associated with the assembly language instructions being debugged, and said microprocessor for executing said binary codes and producing said executable code, comprising the multitude of binary codes representing read, write, and instruction fetch information, in response thereto.

Referring to FIG. 6, a system block diagram of the logic analyzer-inverse assembler of the present invention is illustrated.

A user's circuit 26 includes a first memory 26a (typically a Read-Only-Memory—ROM) connected to a system bus for storing firmware/software to be debugged. It also includes the microprocessor 26b connected to the system bus for executing said firmware/software and generating the executable code, that is, the multitude of binary codes in response thereto. It further includes a second memory 26c (typically a random access memory—RAM) connected to the system bus. The microprocessor 26b is also connected to a personality module 28. The personality module receives the multitude of binary codes from the microprocessor 26b, distinguishes between the assembly language instructions received thereby and stored in the first memory 26a and the data information received thereby and stored in the second memory 26c, and assigns a tag bit to the assembly language instructions received from the microprocessor 26b, and assigns another tag bit to the data information received from said microprocessor. A typical personality module which may be used to perform the function of the personality module 28 shown in FIG. 6 is a module made by Tektronix, Inc., product number PM1XX (e.g. a PM111 for a 6809 microprocessor). Patent application Ser. No. 312,466, filed Oct. 19, 1981, now abandoned, discloses the details of construction associated with the personality module 28. The specification associated with Patent application Ser. No. 312,466, filed Oct. 19, 1981 is hereby incorporated by reference. Alternatively, another personality module which may be used to perform the function of the personality module 28 may be a module identified by Tektronix, Inc. standard part number PM109-MC68000.

A data acquisition probe pod A, 30, receives the assembly language instructions, the data information, and the tag bits corresponding thereto, from the personality module 28, since the data acquisition probe pod A, 30, is connected thereto. The other end of said data acquisition probe pod A, 30, is connected to an acquisition memory 40. In fact, a plurality of data acquisition probe pods, inclusive of data acquisition probe pod B, 34, data acquisition probe pod C, 36, and data acquisition probe pod D, 38, are connected to the acquisition memory 40 by way of data buses. Each of the probe pods, 30, 34, 36, and 38, have eight probe tips connected thereto. The probe tips acquire a plurality of logic signals (representative of the multitude of binary codes) from the terminals of a product under test, such as the personality module 28 or the microprocessor 26b associated with the user's circuit 26. The probe pods transfer the plurality of logic signals to the Acquisition Memory 40. The acquisition memory 40 is divided into sections which correspond to the individual probe pods 30, 34, 36, and 38. Also connected to the acquisition memory 40 is a memory address register 42 which addresses certain locations in the acquisition memory 40 and, in accordance therewith, stores the logic signals from the probe pods therein in locations corresponding to the addressed locations in the acquisition memory, as determined by the memory address register 42. The logic signals acquired by probe pod A, 30 are stored in locations within the acquisition memory 40 corresponding to the section reserved for probe pod A, 30. Similiarly, the logic signals associated with probe pods 34, 36, and 38, are stored in the acquisition memory 40, in locations defined by the memory address register 42, in sections reserved for probe pods B, C, and D, respectively.

Each of the acquisition probe pods are also connected to the input of a word recognition circuit 44. The word recognition circuit 44 detects whether or not a desired word from the acquisition probe has been stored in the acquisition memory 40, and applies an output signal to the main bus of said logic analyzer-inverse assembler in response thereto, the output signal including data, address and control information. The desired word is a word that the user has entered in a menu on the display before the acquisition of data has started. The word recognition circuit 44 is connected to a counter 46, and energizes said counter 46 in response to the receipt of the desired word from an acquisition probe pod. The counter 46 is also energized by a clock input 48, the clock input 48 causing the counter to count to a predetermined quantity. The counter 46 is connected to said memory address register 42 and energizes said memory address register 42 when the count in the counter reaches said predetermined quantity. When the memory address register 42 is energized by said counter 46, the addressing function performed by the memory address register is terminated. As a result, further storage of the logic signals from the acquisition probes into the acquisition memory 40 is terminated.

A controller interface/register circuit 50 is connected to the output of the acquisition memory 40 and, thereby, receives the stored data from the acquisition memory 40 in a read out mode. The interface-register circuit 50 is connected to a main bus 52 of the inverse assembler of the present invention, and thereby supplies the stored data to the main bus. Moreover, the interface/register circuit 50 is connected to the memory address register 42, to the acquisition memory 40, and to the word recognition circuit 44. As a result, when the interface/register circuit 50 receives control data from the main bus 52, the interface/register circuit 50 controls the storage/read out mode of the acquisition memory 40, controls the speed at which the memory address register 42 addresses the acquisition memory 40, and controls the desired word received by the word recognition circuit 44.

A microprocessor 54, a keyboard 56, a random access memory (RAM) 58, a read only memory (ROM) 60, and a display controller 62 are also connected to the main bus 52 of the logic analyzer-inverse assembler.

The microprocessor 54 is a central processing unit. It processes the information retrieved from the acquisition memory 40, via the controller interface register 50, in accordance with instructions received from the keyboard 56 and firmware stored in the read only memory 60 and generates a control signal in response thereto. The random access memory 58 stores said tables therein in the form of said decision tree, the binary codes and the instructions associated therewith being entered and stored within the random access memory 58 of the logic analyzer-inverse assembler via the keyboard 56. The firmware stored in the Read-Only-Memory 60 causes and enables the microprocessor 54 to build said tables in decision tree form for storage in said Random-Access-Memory 58 in response to receipt of the binary codes and instructions associated therewith entered via said keyboard 56. The display controller 62 operates in accordance with instructions received from the read only memory 60 and the processing instructions received from the microprocessor 54 for generating a display on a display monitor 64 of said logic analyzer-inverse assembler. The display presented on the display monitor 64 is generated with the assistance of a character generator 66 interconnected between the display controller 62 on one end and the display monitor 64 on the other end.

The Display monitor 64 generates the displays shown in FIGS. 3a and 3b. The user/operator of the logic analyzer-inverse assembler views said displays on said monitor 64 when transferring the binary codes and instructions associated therewith from the user documentation of the microprocessor 26b of the user's circuit to the logic analyzer-inverse assembler via said keyboard 56. Said binary codes and instructions represent all of the possible binary codes and associated assembly language mnemonics capable of being generated by the microprocessor 26b within the users circuit 26.

The operation of the system block diagram of the logic analyzer-inverse assembler of the present invention, as shown in FIG. 6, in conjunction with FIG. 2, FIG. 3a, 3b, FIGS. 4 and 5 of the drawings, is presented in the paragraphs hereinbelow.

The operator/user of the logic analyzer-inverse assembler refers to the set of user documentation associated with the microprocessor 26b within the user's circuit 26. The user documentation is used to build the table, stored in the random access memory 58 in decision tree form, the information being entered via the keyboard 56. The operator/user causes the logic analyzer-inverse assembler of the present invention to display on the display monitor 64, a display similar to that which is shown in FIG. 3a of the drawings. Using the set of user documentation, the display on Monitor 64 and the keyboard 56, the operator/user fills in and completes the information shown in FIG. 3a, including the binary codes in the first column 10, the names of the other referenced tables in the second column 12, and the instructions associated with the binary codes in the third column 14. The operator/user causes the logic analyzer-inverse assembler to display on monitor 64 a display similar to that which is shown in FIG. 3b of the drawings, and completes the information shown therein. In fact, by referring to the user documentation set forth by the manufacturer of the microprocessor 26b within the user's circuit 26, the operator/user enters via keyboard 56 the multitude of binary codes capable of being generated by the microprocessor 26b.

The microprocessor 54, in accordance with the instructions set forth in the firmware stored in the read only memory 60 causes said tables, such as that which appears in FIG. 3a and 3b, to be stored in the random access memory (RAM) 58, the tables including the binary codes and associated mnemonics entered via the keyboard 56. The microprocessor 54 stores said tables in RAM 58 in the form of the decision tree which is shown in FIG. 2 of the drawings. As a result, a fewer number of entries are required by said logic analyzer-inverse assembler for building said tables to be stored in the random access memory 58.

When the tables are stored in the random access memory 58, in the form of the decision tree as shown in FIG. 2, the inverse assembler of the present invention is ready to acquire the multitude of binary codes from the microprocessor 26b associated with the user's circuit 26. The binary information representative of the set of assembly language instructions stored in the read only memory 26a of the user's circuit is undergoing analysis and debugging. The microprocessor 26b executes the instructions stored in the read only memory 26a, and generates a multitude of binary codes therefrom in response thereto. The personality module 28 receives the multitude of binary codes, and assigns a tag bit to the assembly language instructions included within the multitude of binary codes, and assigns another tag bit to the data information included within the multitude of binary codes received thereby. The data acquisition probe pod A, 30, acquires the multitude of binary codes and the associated tag bits, and stores the binary codes and the tag bits in the acquisition memory 40 of the logic analyzer-inverse assembler. The memory address register 42 addresses the locations within the acquisition memory 40 corresponding to probe pod A, 30, in response to output signals from the clock input 48. When the word recognition circuit 44 receives the desired word from an acquisition probe, the counter 46 generates an output signal, energizing the memory address register 42 in response thereto. As a result, the memory address register 42 terminates its addressing function, thereby terminating the storage in the acquisition memory 40 of the binary codes and the tag bits received from probe pod A, 30. The acquisition memory 40 will then contain information in the format shown in FIG. 4 of the drawings.

As previously mentioned, the random access memory 58 contains said tables in the form of the decision tree shown in FIG. 2 of the drawings. The specific format of the tables will be very similar to the format shown in FIG. 3a and 3b of the drawings. The microprocessor 54 retrieves information stored in the acquisition memory 40, and using said tables stored in RAM 58, converts the assembly language instructions shown in the third column 20 of FIG. 4 into the associated assembly mnemonics, as shown in the second column 24 shown in FIG. 5, and stores the converted assembly language mnemonics, as shown in FIG. 5 of the drawings, into the random access memory 58. The display controller 62 retrieves the converted assembly language mnemonics stored in the random access memory 58, and displays these mnemonics on the display monitor 64, in the form shown in FIG. 5 of the drawings, with the assistance of the character generator 66.

As noted hereinabove, the firmware stored in the read only memory 60 enables the microprocessor 54 to store said tables in RAM 58 the form of a decision tree, as shown in FIGS. 2, 3a, and 3b of the drawings. Once said tables are stored in the random access memory 58, the assembly language instructions stored in the acquisition memory 40, in the form of a multitude of binary codes, are converted to a corresponding set of assembly language mnemonics via said tables, and stored in the random access memory 58 in response thereto. The firmware encoded in the read only memory 60, ultimately responsible for this conversion process, is characterized by the following algorithm:

INVERSE ASSEMBLY ALGORITHM

Description of the Decision Tree Internal Data Format

A table consists of the following:
Table definition:
Describes the environment for table. Contains: Table name, describes what data channels are input to table, and how many entries are in the table.
0–256 Entries:
Each entry contains the "VALUE". The value consists of the binary value with a "Don't Care" mask. Whenever a mask value is zero, the data is compared with the value. When mask is a one (signifying a "X") then no compare is made on this bit.
Each entry then contains 0–9 "Actions". Each Action contains an optional string to be displayed, optional param masks, and an optional table to call.

Algorithm for Calling a Table

As per the Table definition, the appropriate data is read from acquisition (or reference) memory.

The first entry is then compared to the read data. For each data bit, do the following:
If the "Don't Care" mask is zero, then compare the data bit, if they match, then continue and compare next bit. If the "Don't Care" mask is a one then this bit automatically matches. If all bits are compared and match, then this is the entry to use.
If a "no match" occurs, then the comparison is started over on the next entry in the table. This continues until either a match is found or the end of the entries is reached. If the latter case is true, then this table is not called.
Once a match is found the "actions" within the "Entry" must be interpreted.
The possible actions are:
Display a string: (For example "MOVE");
Pick off param bits: (Bits to be passed to another table);
Call another table.
This continues until an end of actions is encountered. When this occurs a return is made out of the current Table to the calling table. If there is no calling table, then inverse assembly is done for this line of acquisition data.

It should be understood that the function of the assignment of tag bits to instructions and data information, within the executable code, may be performed by a post-processing algorithm encoded in the read-only-memory 60, in conjunction with the microprocessor 54, in lieu of the personality Module 28, as described hereinabove.

The invention being thus described, it should be obvious that the same may be varied in many ways. Such variations are not to be regarded as a departure from the spirit and scope of the invention and all such modifications, as would be obvious to one skilled in the art, are intended to be included within the scope of the following claims.

What we claim as novel is:

1. An inverse assembler capable of converting the code associated with a stored program stored in a memory of a user's circuit, the code being generated from a microprocessor disposed in the user's circuit and having instructions and data information, into a corresponding set of mnemonics for interpretation by a user comprising:

means for entering conversion information into said inverse assembler, said conversion information being a list of code corresponding to said code associated with said stored program and a list of said mnemonics corresponding thereto;

means for receiving said conversion information and for storing said conversion information, said conversion information being stored in said receiving and storing means in the form of a set of decision tree tables, each decision tree table including entries for portions of code and mnemonic information corresponding thereto and being in a format corresponding to the format associated with a set of user documentation describing the characteristics of said microprocessor;

means responsive to said code associated with the stored program for distinguishing between said instructions and said data information and for assigning a first identifier to said instructions and a second identifier to said data information;

means for acquiring and storing said code associated with said stored program and said first and second identifiers associated therewith, said receiving and storing means correlating said code stored in said acquiring and storing means with a corresponding set of said conversion information stored in said receiving and storing means by providing a combination of mnemonic information from said tables in response to portions of code as stored in said acquiring and storing means; and means for acquiring said corresponding set of said conversion information from the receiving and storing means and for presenting said corresponding set of said conversion information to said user for interpretation thereof.

2. A method for converting encoded data into decoded data comprising the steps of:

a. storing a first table and a plurality of second tables in a memory, the first table having entries each containing a selected bit pattern, containing a first character string, and referencing one of said plurality of second tables, said second tables having entries each containing a selected bit pattern and containing a second character string, the selected bit pattern in said each table entry being produced by masking an initial value bit pattern provided in each said table entry with the last mentioned bit pattern being at least as long as the selected bit pattern;

b. accessing each entry of said first table and comparing a first portion of said encoded data with the selected bit pattern contained in each such accessed entry of said first table;

c. reading out the first character string contained in each such accessed entry of said first table when said first portion of the encoded data matches the selected bit pattern contained in such accessed entry of said first table;

d. also selecting the second table referenced by each such accessed entry of the first table when said first portion of the encoded data matches the selected bit pattern contained in such accessed entry of said first table;

e. accessing each entry of each said selected second table and comparing a second portion of said encoded data with the selected bit pattern contained in such accessed entry of the second table; and f. reading out the second character string contained in the accessed entry of the second table when said second portion of the encoded data matches the selected bit pattern contained in such accessed entry of the second table, said first and second character strings read out from said tables comprising different portions of said decoded data.

3. The method of claim 2 wherein the second portion of said encoded data is selected by masking the encoded data with a masking code contained in the entry of said first table referencing said second selected table.

* * * * *